(12) United States Patent
Kwon et al.

(10) Patent No.: US 9,359,476 B2
(45) Date of Patent: Jun. 7, 2016

(54) POLYAMIDE RESIN, PREPARATION METHOD THEREFOR, AND MOLDED PRODUCT INCLUDING SAME

(71) Applicant: Cheil Industries Inc., Gumi-si (KR)

(72) Inventors: So Young Kwon, Uiwang-si (KR); Jin Kyu Kim, Uiwang-si (KR); Seung Youb Bang, Uiwang-si (KR); Eun Ju Lee, Uiwang-si (KR); Sang Kyun Im, Uiwang-si (KR); Ki Yon Lee, Uiwang-si (KR); Suk Min Jun, Uiwang-si (KR); Sung Chul Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/655,569

(22) PCT Filed: Mar. 27, 2013

(86) PCT No.: PCT/KR2013/002528
§ 371 (c)(1),
(2) Date: Jun. 25, 2015

(87) PCT Pub. No.: WO2014/104482
PCT Pub. Date: Jul. 3, 2014

(65) Prior Publication Data
US 2015/0353681 A1 Dec. 10, 2015

(30) Foreign Application Priority Data

Dec. 28, 2012 (KR) ........................ 10-2012-0157673

(51) Int. Cl.
| | |
|---|---|
| C08G 69/26 | (2006.01) |
| C08G 69/28 | (2006.01) |
| C08L 77/00 | (2006.01) |
| C08G 69/48 | (2006.01) |
| C08L 77/06 | (2006.01) |
| C08G 69/36 | (2006.01) |

(52) U.S. Cl.
CPC .............. *C08G 69/265* (2013.01); *C08G 69/28* (2013.01); *C08G 69/36* (2013.01); *C08G 69/48* (2013.01); *C08L 77/06* (2013.01)

(58) Field of Classification Search
None
See application file for complete search history.

(56) References Cited

U.S. PATENT DOCUMENTS

| | | | |
|---|---|---|---|
| 5,763,561 | A | 6/1998 | Keske |
| 5,786,429 | A | 7/1998 | Allen |
| 5,837,803 | A | 11/1998 | Nakano |
| 5,962,628 | A | 10/1999 | Keske |
| 6,303,741 | B1 | 10/2001 | Tanaka |
| 6,383,181 | B1 | 5/2002 | Johnston et al. |
| 6,433,047 | B2 | 8/2002 | Nakamura et al. |
| 8,324,307 | B2 | 12/2012 | Harder et al. |
| 2009/0098325 | A1 | 4/2009 | Uchida et al. |
| 2012/0172539 | A1 | 7/2012 | Kwon et al. |

FOREIGN PATENT DOCUMENTS

| | | |
|---|---|---|
| EP | 0827976 A2 | 3/1998 |
| JP | 11-106504 | 4/1999 |
| JP | 2001-011175 | 1/2001 |
| JP | 2002-080716 A | 3/2002 |
| JP | 3664577 | 4/2005 |
| JP | 4317615 | 5/2009 |
| KR | 2004-0042336 A | 5/2004 |
| KR | 10-0633206 B1 | 10/2006 |
| KR | 10-2007-0119646 A | 12/2007 |
| KR | 2006-0077993 | 4/2008 |
| KR | 10-1132225 B1 | 4/2012 |
| KR | 10-2012-0078539 A | 7/2012 |
| KR | 2012-0078588 A | 7/2012 |
| WO | 2009/012932 | 1/2009 |
| WO | 2014/104482 A1 | 7/2014 |

*Primary Examiner* — Ana Woodward
(74) *Attorney, Agent, or Firm* — Additon, Higgins & Pendleton, P.A.

(57) ABSTRACT

The polyamide resin of the present invention is a polyamide resin containing an amine group and a carboxyl group, wherein the amine group concentration is about 200 to 300 μeq/g and two to six times as high as the carboxyl group concentration. The polyamide resin has excellent long-thermal stability.

14 Claims, No Drawings

POLYAMIDE RESIN, PREPARATION METHOD THEREFOR, AND MOLDED PRODUCT INCLUDING SAME

CROSS-REFERENCE TO RELATED APPLICATIONS

This application claims priority to and the benefit of International Application No. PCT/KR2013/002528, filed Mar. 27, 2013, which published as WO 2014/104482 on Jul. 3, 2014, and Korean Patent Application No. 10-2012-0157673, filed in the Korean Intellectual Property Office on Dec. 28, 2012, the entire disclosure of each of which is incorporated herein by reference.

TECHNICAL FIELD

The present invention relates to a polyamide resin, a method for preparing the same, and a molded article including the same. More particularly, the present invention relates to a highly heat-resistant polyamide resin having improved long-term heat-resistant stability by adjusting the concentration and ratio of an amine group in the polyamide resin, a method for preparing the same, and a molded article including the polyamide resin.

BACKGROUND ART

PA4T, PA6T, PA9T, PA10T, PA11T, PA12T, and the like have been known as a highly heat-resistant nylon (polyamides). In the highly heat-resistant nylon, a highly heat-resistant nylon in which a long-chain diamine having at least 9 carbon atoms such as PA9T is used may be directly used as a homopolymer, or may be used in the form of a copolymerized polymer in which a comonomer is used at a small quantity. PA4T and PA6T may not be used alone since they have a very high melting temperature (Tm), and a lower decomposition temperature than a processing temperature thereof. In this case, PA4T and PA6T are to be generally copolymerized to reduce the processing temperature. A single- or long-chain aliphatic diamine, a cyclic aliphatic diamine, a branched aliphatic diamine, a single- or long-chain aliphatic dicarboxylic acid, a cyclic aliphatic dicarboxylic acid, and a branched aliphatic dicarboxylic acid may be used as a comonomer of PA6T. In general, adipic acid, isophthalic acid, and the like have been used.

Particularly, in order to use articles made of such a highly heat-resistant nylon as a material for a UTH (under the hood) engine room for automobiles, long-term heat-resistant stability, in which their certain physical properties may be maintained at a condition of a temperature of about 150° C. or higher, for example, about 200 to about 220° C., and a glass transition temperature (Tg) characteristic at about 120° C. or higher are required. As a method capable of improving the long-term heat-resistant stability of the highly heat-resistant nylon, there is a method of increasing a concentration of an amine group in a polymer compared to a concentration of a carboxylic group. Also, comonomers may be combined to adjust a melting temperature (Tm) to enhance melt processability, and a glass transition temperature (Tg) to maintain physical properties at a high temperature.

Korean Unexamined Patent Application Publication No. 2007-0119646 discloses an semi-aromatic polyamide resin having improved retention stability, hot water resistance, chemical resistance, and adhesivity or compatibility to/with other resins by sealing at least about 10% of molecular chain end groups of the polyamide resin and adjusting the ratio of [end amine groups]/[end acid radicals] to about 6 or more. However, the long-term thermal stability and the glass transition temperature characteristic at about 120° C. or higher may not be maintained only when the concentration and ratio of the end amine groups are maintained at a high level.

DISCLOSURE

Technical Problem

Therefore, it is an aspect of the present invention to provide a highly heat-resistant polyamide resin having excellent long-term thermal stability, a method for preparing the same, and a molded article including the polyamide resin.

It is another aspect of the present invention to provide a polyamide resin having a glass transition temperature of about 120° C. or higher, and excellent processability and heat resistance, a method for preparing the same, and a molded article including the polyamide resin.

All the above and other objects and features of the present invention can be achieved by exemplary embodiments of the present invention as will be described later.

Technical Solution

One aspect of the present invention relates to a polyamide resin. The polyamide resin is a polyamide resin containing an amine group and a carboxyl group, characterized in that the amine group is present at a concentration of about 200 to about 300 μeq/g, and the concentration of the amine group is about 2 to about 6 times the concentration of the carboxyl group.

In one embodiment, the polyamide resin may be obtained by polymerizing (A) a dicarboxylic acid component including (a1) an aromatic dicarboxylic acid and (B) a diamine component including (b1) an aliphatic diamine.

In one embodiment, the aromatic dicarboxylic acid (a1) may include at least one of aromatic dicarboxylic acids having 8 to 20 carbon atoms.

In one embodiment, the aliphatic diamine (b1) may be a compound including at least one of aliphatic diamines having 4 to 20 carbon atoms.

In one embodiment, the dicarboxylic acid component (A) may further include (a2) an amine group-containing dicarboxylic acid.

In one embodiment, the amine group-containing dicarboxylic acid (a2) may be represented by the following Formula 1:

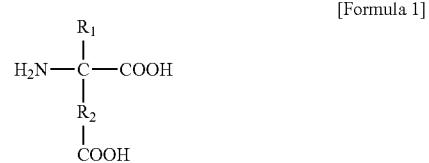

[Formula 1]

In Formula 1, $R_1$ is a hydrogen atom, or a hydrocarbon group having 1 to 10 carbon atoms, and $R_2$ is a substituted or unsubstituted, linear, branched or cyclic hydrocarbon group having 1 to 20 carbon atoms.

In one embodiment, the amine group-containing dicarboxylic acid (a2) may be included at a content of about 0.1 to about 30 mol %, based on the total content of the dicarboxylic acid component (A).

In one embodiment, the polyamide resin may have an end group capped with an end capping agent including an aliphatic carboxylic acid and an aromatic carboxylic acid.

In one embodiment, the polyamide resin may have an intrinsic viscosity of about 0.6 to about 1.5 dL/g, as measured in a 25° C. sulfuric acid solution using an Ubbelohde viscometer.

In one embodiment, the polyamide resin may have a glass transition temperature (Tg) of about 120° C. or higher.

In one embodiment, the polyamide resin may have a melting temperature (Tm) of about 280 to about 320° C., and a crystallization temperature (Tc) of about 260 to about 280° C.

Another aspect of the present invention relates to a method for preparing the polyamide resin. The method includes polymerizing (A) a dicarboxylic acid component comprising (a1) an aromatic dicarboxylic acid and (B) a diamine component comprising (b1) an aliphatic diamine so that an amine group in the resin is present at a concentration of about 200 to about 300 μeq/g, and the concentration of the amine group is about 2 to about 6 times the concentration of a carboxyl group.

In one embodiment, the dicarboxylic acid component (A) may further include (a2) an amine group-containing dicarboxylic acid at a content of about 0.1 to about 30 mol %, based on the total content of the dicarboxylic acid component (A).

A further aspect of the present invention relates to a molded article formed from the polyamide resin.

Advantageous Effects

The present invention has an effect of providing a highly heat-resistant polyamide resin having excellent long-term heat-resistant stability, having a glass transition temperature of about 120° C. or higher and exhibiting excellent processability and heat resistance, a method for preparing the same, and a molded article including the polyamide resin.

BEST MODE

Hereinafter, embodiments of the present invention will be described in detail as follows.

A polyamide resin according to the present invention is a polyamide resin containing an amine group and a carboxyl group. Wherein, the amine group is present at a concentration of about 200 to about 300 μeq/g, and the concentration of the amine group is about 2 to about 6 times the concentration of the carboxyl group. Therefore, the polyamide resin may have excellent long-term heat-resistant stability.

In one embodiment, the polyamide resin may be obtained by polymerizing (A) a dicarboxylic acid component including (a1) an aromatic dicarboxylic acid and (B) a diamine component including (b1) an aliphatic diamine, and thus may have a repeating structure of a dicarboxylic acid moieties derived from the dicarboxylic acid component (A) and a diamine moiety derived from the diamine component (B).

In this specification, the term "dicarboxylic acid component" is used as a meaning encompassing a dicarboxylic acid, and an alkyl ester (a lower alkyl ester having 1 to 4 carbon atoms, such as monomethyl, monoethyl, dimethyl, diethyl, or dibutyl ester) or acid anhydride thereof, and reacts with a diamine component to form a dicarboxylic acid moiety. In this specification, the dicarboxylic acid moiety and the diamine moiety also refers to a residue remaining after hydrogen atoms, a hydroxyl group, or an alkoxy group is removed when the dicarboxylic acid component and the diamine component are subjected to a polymerization reaction.

The concentrations of the amine group (—NH$_2$) and carboxyl group (—COOH) of the polyamide resin are measured for 0.1 N HCl, and 0.1 N KOH using a potential analyzer after the polyamide resin is dissolved in a phenol/chloroform solution. The concentration of the amine group in the polyamide resin measured thus is in a range of about 200 to about 300 μeq/g, preferably a range of about 250 to about 300 μeq/g, and more preferably a range of about 250 to about 280 μeq/g, and the concentration of the amine group is about 2 to about 6 times, preferably about 3 to about 6 times, and more preferably about 4 to about 6 times higher than the concentration of the carboxyl group in the polyamide resin. When the concentration of the amine group in the polyamide resin is less than about 200 μeq/g, the long-term heat-resistant stability of the polyamide resin may be deteriorated. On the other hand, when the concentration of the amine group in the polyamide resin is greater than about 300 μeq/g, a gel may be unavoidably formed upon solid state polymerization. Also, when the concentration of the amine group is not about 2 higher than the concentration of the carboxyl group, the long-term heat-resistant stability of the polyamide resin may be deteriorated. On the other hand, when the concentration of the amine group is about 6 or more times the concentration of the carboxyl group, a time required to improve a degree of polymerization may be extended, or the molecular weight may not sufficiently increase.

(A) Dicarboxylic Acid Component

The dicarboxylic acid component (A) used in the present invention includes (a1) a typical aromatic dicarboxylic acid used to prepare a highly heat-resistant polyamide resin (nylon).

The aromatic dicarboxylic acid (a1) may include at least one compound selected from the group consisting of aromatic dicarboxylic acids having 8 to 20 carbon atoms. For example, the aromatic dicarboxylic acid (a1) may include terephthalic acid, isophthalic acid, 2,6-naphthalenedicarboxylic acid, 2,7-naphthalenedicarboxylic acid, 1,4-naphthalenedicarboxylic acid, 1,4-phenylenedioxyphenylene acid, 1,3-phenylenedioxydiacetic acid, diphenic acid, 4'4'-oxybis(benzoic acid), diphenylmethane-4,4'-dicarboxylic acid, diphenylsulfone-4,4'dicarboxylic acid, 4-4'-diphenylcarboxylic acid, or a mixture thereof, preferably terephthalic acid, isophthalic acid, or a mixture thereof, and more preferably terephthalic acid, or a mixture of terephthalic acid and isophthalic acid.

The polyamide resin of the present invention may further include (a2) an amine group-containing dicarboxylic acid including two carboxyl groups (—COOH) and one amine group (—NH$_2$) in order to enhance the concentration and ratio of the amine group in the polyamide resin. A compound having two carboxylic groups and one amine group may be used as the amine group-containing dicarboxylic acid (a2) without limitation. Preferably, a compound represented by the following Formula 1 may be used as the amine group-containing dicarboxylic acid (a2).

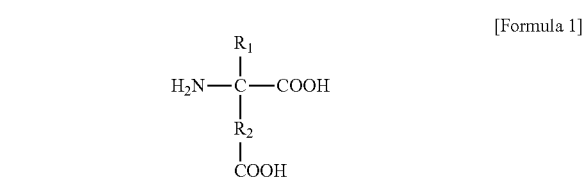

[Formula 1]

In Formula 1, R$_1$ is a hydrogen atom, or a hydrocarbon group having 1 to 10 carbon atoms, and R$_2$ is a substituted or unsubstituted, linear, branched or cyclic hydrocarbon group having 1 to 20 carbon atoms, for example, a substituted or unsubstituted, linear or branched alkylene group having 1 to 20 carbon atoms, a substituted or unsubstituted, cyclic alkylene group having 1 to 20 carbon atoms, or an arylene group.

In this specification, the term "substituted" means that a hydrogen atom is substituted with a substituent selected from the group consisting of a $C_1$-$C_{10}$ alkyl group, $C_6$-$C_{18}$ aryl group, halogen, and a combination thereof. Preferably, the substituent may be a $C_1$-$C_6$ alkyl group, more preferably a $C_1$-$C_3$ alkyl group.

Specific examples of the amine group-containing dicarboxylic acid (a2) that may be used herein may include aspartic acid, L-glutamic acid, D-glutamic acid, D,L-glutamic acid, and the like, but the present invention is not limited thereto. Preferably, the amine group-containing dicarboxylic acid (a2) may include an acidic amino acid compound such as L-glutamic acid.

When the amine group-containing dicarboxylic acid (a2) is included, the amine group-containing dicarboxylic acid (a2) may be further included at a content of about 0.1 to about 30 mol %, preferably about 1 to about 25 mol %, and more preferably about 5 to about 20 mol %, based on the total content of the dicarboxylic acid component (A). Within this content range, a polyamide resin having excellent physical properties such as long-term heat-resistant stability, crystallinity, processability, and heat resistance may be obtained.

Also, the dicarboxylic acid component (A) may further include (a3) adipic acid in order to further enhance processability of the polyamide resin. The adipic acid (a3) may be further included at a content of less than about 20 mol %, preferably about 5 to about 15 mol %, and more preferably about 8 to about 13 mol %, based on the total content of the dicarboxylic acid component (A). Within this content range, a polyamide resin having excellent physical properties such as long-term thermal stability, crystallinity, processability, and heat resistance may be obtained.

(B) Diamine Component

The diamine component (B) used in the present invention includes (b1) a typical aliphatic diamine used to prepare a highly heat-resistant polyamide resin (nylon).

The aliphatic diamine (b1) may include at least one compound of aliphatic diamines having 4 to 20 carbon atoms. For example, the aliphatic diamine (b1) may include without limitation 1,4-butanediamine, 1,6-hexanediamine (hexamethylenediamine), 1,7-heptanediamine, 1,8-octanediamine, 1,10-decanediamine, 3-methyl-1,5-pentanediamine, 2,2,4-trimethyl-1,6-hexanediamine, 2,4,4-trimethyl-1,6-hexanediamine, 5-methyl-1,9-nonanediamine, 2,2-oxybis(ethylamine), bis(3-aminopropyl)ether, ethylene glycol bis(3-aminopropyl)ether (EGBA), 1,7-diamino-3,5-dioxoheptane, and the like, and mixtures thereof. Preferably, 1,4-butanediamine, 1,6-hexanediamine, and mixtures thereof, and more preferably 1,6-hexanediamine may be used herein.

Also, the diamine component (B) may include (b2) at least one compound of another diamine of an alicyclic diamine such as cyclohexyldiamine, methylcyclohexyldiamine, bis(p-cyclohexyl)methanediamine, bis(aminomethyl)norbornane, or bis(aminomethyl)tricyclodecane, bis(aminomethyl)cyclohexane, an aromatic diamine such as p-phenylenediamine, m-phenylenediamine, xylenediamine, 4,4'-diaminodiphenylsulfone, or 4,4'-diaminodiphenylether, and the like, and mixtures thereof, when necessary.

In the diamine component (B), the content of the aliphatic diamine (b1) is in a range of 60 mol % or more, preferably about 70 to about 95 mol %, and more preferably about 80 to about 90 mol %, the content of the another diamine (b2) is in a range of about 40 mol % or less, preferably about 5 to about 30 mol %, and more preferably about 10 to about 20 mol %. Within this content range, a polyamide resin having excellent physical properties such as long-term heat-resistant stability, crystallinity, processability, and heat resistance may be obtained.

In the polyamide resin according to the present invention, the ratio of the dicarboxylic acid component (A) and the diamine component (B) (molar ratio: diamine component (B)/dicarboxylic acid component (A)) may, for example, in a range of about 1.0 to about 1.1, preferably about 1.0 to about 1.05. Within this ratio range, the degradation of the physical properties caused by unreacted monomers may be prevented.

The polyamide resin of the present invention may have an end group capped with an end capping agent such as aliphatic carboxylic acid, aromatic carboxylic acid, and the like. The end capping agent may include at least one selected from the group consisting of acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, and methylnaphthalene carboxylic acid, but the present invention is not limited thereto.

When the end capping agent is used, the end capping agent may, for example, be included at a content of about 0.01 to about 5 molar parts, preferably about 0.1 to about 3 molar parts, based on 100 molar parts of the dicarboxylic acid component (A) and the diamine component (B).

In one embodiment, the polyamide resin may have an intrinsic viscosity of about 0.6 to about 1.5 dL/g, preferably about 0.7 to about 1.2 dL/g, as measured in a 25° C. sulfuric acid solution using an Ubbelohde viscometer. The polyamide resin according to one exemplary embodiment of the present invention may have excellent long-term heat-resistant stability and high heat resistance even within this range of intrinsic viscosity as the amine group in the polyamide resin may be present in a concentration of about 200 to about 300 μeq/g, and the concentration of the amine group may be about 2 to about 6 times the concentration of the carboxyl group in the polyamide resin.

The polyamide resin may have a glass transition temperature (Tg) of about 120° C. or higher, preferably about 125° C. or higher, and more preferably about 125 to about 140° C. Within this temperature range, the polyamide resin may have high heat resistance, and heat and fire resistance for use in parts for a UTH engine room for automobiles.

The polyamide resin may have a crystallization temperature (Tc) of about 260 to about 280° C., preferably about 260 to about 275° C., and a melting temperature (Tm) of about 280 to about 320° C., preferably about 290 to about 310° C. Within these temperature ranges, the polyamide resin may have excellent processability. The glass transition temperature, the crystallization temperature, and the melting temperature may be measured using a differential scanning calorimeter (DSC) and a thermogravimetric analyzer (TGA).

Further, the long-term heat-resistant stability of the polyamide resin is evaluated by compounding 35 parts by weight of a glass fiber (GF) with respect to 100 parts by weight of the polyamide resin to measure an initial tensile strength (units: kgf/cm2), retaining the mixture at 220° C. for 800 hours, measuring a tensile strength of the mixture, and comparing the initial tensile strength with tensile strength after 800 hours, when it assumed that the initial tensile strength is set to 100%, to calculate a maintenance rate. The long-term heat-resistant stability (tensile strength maintenance rate) of the polyamide resin may, for example, be about 40% or more, preferably about 45% or more, and more preferably in a range of about 55 to about 90%. Within this range, the polyamide resin may have excellent long-term heat-resistant stability.

Another aspect of the present invention provides a method for preparing the polyamide resin. The method for preparing the polyamide resin according to the present invention includes polymerizing (A) a dicarboxylic acid component including (a1) an aromatic dicarboxylic acid and (B) a diamine component including (b1) an aliphatic diamine so that the amine group in the resin is present at a concentration of about 200 to about 300 μeq/g, and the concentration of the amine group is about 2 to about 6 times the concentration of a carboxyl group.

In one embodiment, the dicarboxylic acid component (A) may further include (a2) an amine group-containing dicarboxylic acid at a content of about 0.1 to about 30 mol %, based on the total content of the dicarboxylic acid component (A).

In the method for preparing the polyamide resin, the polymerization may be performed using a conventional method for preparing a polyamide, for example, melt polymerization method, etc.

Upon the polymerization, a polymerization temperature may be in a range of about 80 to about 300° C., preferably about 80 to about 280° C., and a polymerization pressure may be in a range of about 10 to about 40 kgf/cm2, but the present invention is not limited thereto.

In one embodiment, the polyamide resin may be obtained by filling a reactor with the dicarboxylic acid component (A), the diamine component (B), a catalyst, and water, stirring the resulting mixture at about 80 to about 150° C. for about 0.5 to about 2 hours, maintaining the mixture at a temperature of about 200 to about 280° C. and a pressure of about 20 to about 40 kgf/cm2 for about 2 to about 4 hours, reducing the pressure to about 10 to about 20 kgf/cm2, causing the mixture to react for about 1 to about 3 hours (polymerization), and subjecting a polyamide thus obtained to solid state polymerization at a temperature between the glass transition temperature (Tg) and the melting temperature (Tm) for about 10 to about 30 hours in a vacuum state.

A catalyst may be used in the polymerization reaction. A phosphorus-based catalyst may be used as the catalyst. For example, a catalyst including phosphoric acid, phosphorous acid, hypophosphorous acid, or a salt or derivative thereof may be used. As a more specific example, a catalyst including phosphoric acid, phosphorous acid, hypophosphorous acid, sodium hypophosphate, sodium hypophosphinate, and the like may be used.

For example, the catalyst may be used at a content of about 0.001 to about 3 molar parts, preferably about 0.01 to about 1 molar parts, and more preferably about 0.01 to about 0.5 parts by weight, based on 100 molar parts of the dicarboxylic acid component (A) and the diamine component (B), but the present invention is not limited thereto.

In the method for preparing the polyamide resin, the end capping agent may also be used within this content range. In this case, the viscosity of the polyamide resin synthesized by adjusting the content of the end capping agent, and the concentration and ratio of the amine group may be adjusted.

A further aspect of the present invention provides a product (a molded article). The product according to one exemplary embodiment of the present invention is molded (prepared) from the polyamide resin. For example, the polyamide resin may be prepared from a material for a UTH engine room for automobiles requiring a high glass transition temperature, but the present invention is not limited thereto. The molded article may be easily formed by those skilled in the related art to which the present invention belongs.

MODE FOR INVENTION

Hereinafter, the present invention will be described in further detail with reference to exemplary embodiments. However, it should be understood that the description proposed herein is just a preferable example for the purpose of illustrations only, not intended to limit the scope of the invention.

EXAMPLES

Examples 1 to 3 and Comparative Examples 1 to 4

Terephthalic acid (TPA), isophthalic acid (IPA), L-glutamic acid (GAd), and adipic acid (AA) as dicarboxylic acid components (diacids), and 1,6-hexamethylenediamine (HMDA) as a diamine component were added according to compositions as listed in the following Table 1. Next, 1.5 molar parts of acetic acid was added as an end capping agent, based on 100 molar parts of the dicarboxylic acid component and the diamine component, and 0.1 parts by weight of sodium hypophosphinate as a catalyst, and 38 parts by weight of water were added together into a 1 L autoclave, based on 100 molar parts of the dicarboxylic acid component and the diamine component, and the autoclave was filled with nitrogen. The resulting mixture was stirred at 130° C. for 60 minutes, warmed to 250° C. for 2 hours, and then reacted while maintaining the pressure at 35 kgf/cm$^2$. Thereafter, the mixture was decompressed to 15 kgf/cm$^2$, and reacted for an hour to prepare a polyamide precopolymer. The prepared polyamide precopolymer was subjected to solid state polymerization at 230° C. for 8 hours to obtain a polyamide resin. The prepared polyamide resin was measured for intrinsic viscosity (IV) in a 25° C. sulfuric acid solution using an Ubbelohde viscometer. Then, the prepared polyamide resin was dissolved in a phenol/chloroform solution, and the concentration of the amine group (amine concentration), and the concentration of the carboxylic group (acid concentration) in the polyamide resin prepared using 0.1 N HCl and 0.1 N KOH were measured using a potential analyzer. The measurement results are listed in the following Table 1.

TABLE 1

| | | Examples | | | Comparative Examples | | | |
|---|---|---|---|---|---|---|---|---|
| Monomer (molar part) | | 1 | 2 | 3 | 1 | 2 | 3 | 4 |
| Diacid | TPA | 65 | 65 | 65 | 65 | 65 | 65 | 65 |
| | IPA | 30 | 25 | 15 | — | 25 | — | 30 |
| | GAd | 5 | 10 | 20 | — | — | 35 | 20 |
| | AA | — | — | — | 35 | 10 | — | — |
| Diamine | HMDA | 100 | 100 | 100 | 100 | 100 | 100 | 100 |
| Molar ratio | [Diamine]/[Diacid] | 1.03 | 1.025 | 1.027 | 1.01 | 1.008 | 1.04 | 1.07 |
| Amine concentration (μeq/g) | | 273 | 250 | 260 | 88 | 48 | Gelation | 350 |
| Acid concentration (μeq/g) | | 77 | 70 | 85 | 130 | 84 | Gelation | 54 |

TABLE 1-continued

|  | Examples | | | Comparative Examples | | | |
| --- | --- | --- | --- | --- | --- | --- | --- |
| Monomer (molar part) | 1 | 2 | 3 | 1 | 2 | 3 | 4 |
| Amine concentration/acid concentration | 3.5 | 3.6 | 3.1 | 1.48 | 1.75 | Gelation | 6.5 |
| IV (dL/g) | 0.8 | 0.82 | 0.85 | 0.8 | 0.9 | — | 0.4 |

The polyamide resins prepared in Examples and Comparative Examples were evaluated for melting temperature (Tm), crystallization temperature (Tc), glass transition temperature (Tg), intrinsic viscosity, and long-term heat-resistant stability using methods as will be described below. The results are listed in the following Table 2.

Physical Property Evaluation Method (1) Melting temperature, crystallization temperature, and glass transition temperature (Units: ° C.): The polyamide resins obtained after solid state polymerization in Examples and Comparative Examples were measured using a differential scanning calorimeter (DSC). A Q20 measuring machine (commercially available from TA Instruments Co. Ltd) was used as the DSC, and the measurements were performed under conditions of a nitrogen atmosphere, a heating rate of 10° C./min in a temperature range of from 30 to 400° C., and a cooling rate of 10° C./min. In this case, the crystallization temperature was set as the highest point of an exothermic peak during cooling, and the melting temperature was set the highest point of an endothermic peak during the second heating. Also, the glass transition temperature was set a temperature measured during the second heating.

(2) Intrinsic viscosity (Units: dL/g): The polyamide resins were measured at 25° C. in a 97% sulfuric acid solution using an Ubbelohde viscometer.

(3) Long-term heat-resistant stability (Tensile strength maintenance rate; units: %): 35 parts by weight of a glass fiber (GF) was added to 100 parts by weight of the polyamide resin, and compounded using a twin-screw extruder (L/D=37). Thereafter, the resulting mixture was measured for initial tensile strength (Units: kgf/cm$^2$). The extrusion was performed at 300 to 330° C. in consideration of the melting temperature. Subsequently, the extrudate was retained at 220° C. for 800 hours, and then measured for tensile strength. Then, when it was assumed that the initial tensile strength was set to be 100%, the initial tensile strength was compared with the tensile strength obtained after 800 hours to calculate a maintenance rate, thereby evaluating the long-term heat-resistant stability. It was revealed that the polyamide resins had superior long-term thermal stability as the maintenance rate increased.

As seen from the results of Table 2, it was revealed that the amine group in the each of the polyamide resins according to one exemplary embodiment of the present invention (Examples 1 to 3) was present at a concentration of 200 to 300 μeq/g, and the concentration of the amine group in the polyamide resin was 2 to 6 times the concentration of the carboxyl group in the polyamide resin. Therefore, it could be seen from the results obtained for glass transition temperature that the polyamide resins according to one exemplary embodiment of the present invention had excellent heat resistance, and also seen from the results obtained for melting temperature and crystallization temperature that the polyamide resins according to one exemplary embodiment of the present invention had excellent moldability. Also, it could be seen that the polyamide resins according to one exemplary embodiment of the present invention had high long-term heat-resistant stability. On the other hand, it could be seen that the polyamide resins (Comparative Examples 1 to 4) in which the concentration and ratio of the amine group fell out of the scope of the present invention had a low glass transition temperature, a very low intrinsic viscosity, or a low long-term heat-resistant stability (a tensile strength maintenance rate) of 40% or less.

It will be apparent to those skilled in the art that various changes and modifications can be made to the exemplary embodiments of the present invention without departing from the scope of the invention. Thus, it is intended that the present invention covers all such changes and modifications provided they come within the scope of the appended claims and their equivalents.

The invention claimed is:

1. A polyamide resin containing an amine group and a carboxyl group,
    wherein the amine group is present at a concentration of about 200 to about 300 μeq/g, and
    the concentration of the amine group is about 2 to about 6 times the concentration of the carboxyl group, and
    tensile strength maintenance rate of the polyamide resin evaluated by compounding 35 parts by weight of a glass fiber (GF) with respect to 100 parts by weight of the polyamide resin is 45% or more.

2. The polyamide resin of claim 1, wherein the polyamide resin is obtained by polymerizing (A) a dicarboxylic acid

TABLE 2

|  | Examples | | | Comparative Examples | | | |
| --- | --- | --- | --- | --- | --- | --- | --- |
|  | 1 | 2 | 3 | 1 | 2 | 3 | 4 |
| Melting temperature (° C.) | 300 | 298 | 299 | 314 | 308 | 293 | 299 |
| Crystallization temperature (° C.) | 265 | 264 | 263 | 275 | 255 | 255 | 264 |
| Glass transition temperature (° C.) | 135 | 135 | 124 | 104 | 125 | 113 | 132 |
| Intrinsic viscosity (dL/g) | 0.83 | 0.84 | 0.82 | 1.05 | 0.85 | Gelation | Gelation |
| Long-term heat-resistant stability | 60% | 59% | 61% | 16% | 35% | 40 | 30% | component comprising (a1) an aromatic dicarboxylic acid and (B) a diamine component comprising (b1) an aliphatic diamine.

3. The polyamide resin of claim 2, wherein the aromatic dicarboxylic acid (a1) comprises at least one of aromatic dicarboxylic acids having 8 to 20 carbon atoms.

4. The polyamide resin of claim 2, wherein the aliphatic diamine (b1) comprises at least one of aliphatic diamines having 4 to 20 carbon atoms.

5. The polyamide resin of claim 2, wherein the dicarboxylic acid component (A) further comprises (a2) an amine group-containing dicarboxylic acid.

6. The polyamide resin of claim 5, wherein the amine group-containing dicarboxylic acid (a2) is represented by the following Formula 1:

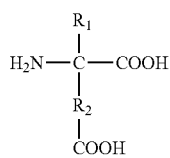

[Formula 1]

wherein $R_1$ is a hydrogen atom, or a hydrocarbon group having 1 to 10 carbon atoms, and $R_2$ is a linear, branched or cyclic hydrocarbon group having 1 to 20 carbon atoms, unsubstituted or substituted with a substituent selected from the group consisting of a $C_1$-$C_{10}$ alkyl group, $C_6$-$C_{18}$ aryl group, halogen, and a combination thereof.

7. The polyamide resin of claim 5, wherein the dicarboxylic acid component (A) includes the amine group-containing dicarboxylic acid (a2) in an amount of about 0.1 to about 30 mol %, based on the total amount of the dicarboxylic acid component (A).

8. The polyamide resin of claim 1, wherein the polyamide resin has an end group capped with an end capping agent comprising at least one of an aliphatic carboxylic acid and/or an aromatic carboxylic acid.

9. The polyamide resin of claim 1, wherein the polyamide resin has an intrinsic viscosity of about 0.6 to about 1.5 dL/g, as measured in a 25° C. sulfuric acid solution using an Ubbelohde viscometer.

10. The polyamide resin of claim 1, wherein the polyamide resin has a glass transition temperature (Tg) of about 120° C. or higher.

11. The polyamide resin of claim 1, wherein the polyamide resin has a melting temperature (Tm) of about 280 to about 320° C., and a crystallization temperature (Tc) of about 260 to about 280° C.

12. A molded article comprising the polyamide resin defined in claim 1.

13. A method for preparing a polyamide resin, comprising:
polymerizing (A) a dicarboxylic acid component comprising (a1) an aromatic dicarboxylic acid and (B) a diamine component comprising (b1) an aliphatic diamine so that an amine group in the resin is present at a concentration of about 200 to about 300 μeq/g, and the concentration of the amine group is about 2 to about 6 times the concentration of a carboxyl group,
wherein tensile strength maintenance rate of the polyamide resin evaluated by compounding 35 parts by weight of a glass fiber (GF) with respect to 100 parts by weight of the polyamide resin is 45% or more.

14. The method of claim 13, wherein the dicarboxylic acid component (A) further comprises (a2) an amine group-containing dicarboxylic acid in an amount of about 0.1 to about 30 mol %, based on the total amount of the dicarboxylic acid component (A).

\* \* \* \* \*